United States Patent [19]
Treloar

[11] Patent Number: 5,099,634
[45] Date of Patent: Mar. 31, 1992

[54] METHOD AND MEANS FOR LOADING PACKAGED PARTICULATE MATERIALS

[75] Inventor: Norman M. Treloar, Stirling East, Australia

[73] Assignee: Browntree Trading Company Proprietary Ltd., Adelaide, Australia

[21] Appl. No.: 624,098

[22] Filed: Dec. 10, 1990

Related U.S. Application Data

[63] Continuation-in-part of Ser. No. 272,802, filed as PCT/AU87/00395, Nov. 25, 1987, abandoned.

[30] Foreign Application Priority Data

Nov. 25, 1986 [AU] Australia ............... PH9150
Jan. 19, 1987 [AU] Australia ............... PH9922

[51] Int. Cl.$^5$ ............................................. B65B 5/10
[52] U.S. Cl. ......................................... 53/475; 53/244
[58] Field of Search ............ 53/152, 244, 255, 259, 53/260, 475; 198/536, 588, 589, 787; 414/138.6, 139.1, 139.3, 140.2, 140.8, 393, 398

[56] References Cited

U.S. PATENT DOCUMENTS

| | | | |
|---|---|---|---|
| 3,184,038 | 5/1965 | Petchuk | 198/588 |
| 3,748,797 | 7/1973 | Deines | 53/152 X |
| 4,281,955 | 8/1981 | McWilliams | 414/398 |
| 4,813,526 | 3/1989 | Belanger | 198/588 X |

FOREIGN PATENT DOCUMENTS

| | | | |
|---|---|---|---|
| 049826 | 4/1982 | European Pat. Off. | |
| 1556087 | 1/1970 | Fed. Rep. of Germany | 414/398 |
| 0018177 | 2/1978 | Japan | 414/398 |

Primary Examiner—John Sipos
Assistant Examiner—Linda B. Johnson
Attorney, Agent, or Firm—Cushman, Darby & Cushman

[57] ABSTRACT

An arrangement for loading materials, especially bags of particulate materials such as wheat, into shipping containers in which a belt conveyor is supported so that it can be controlled in a forward to aft position and can be tilted and slewed, the belt conveyor being controllable in speed so that high accelerating speeds can be offered for packages loaded on the conveyor and a separately controllable serving conveyor to locate packages from time to time on the loading conveyor for shooting into the container.

10 Claims, 6 Drawing Sheets

METHOD AND MEANS FOR LOADING PACKAGED PARTICULATE MATERIALS

This is a continuation-in-part of application Ser. No. 07/272,802, filed as PCT/AU87/00395, Nov. 25, 1987 (now abandoned).

BACKGROUND OF THE INVENTION

This invention relates to a method and means for loading a container.

The invention is not intended to be limited to loading of only containers but has particular value when so applied.

The problem to which this invention has particular application relates to the loading of containers insofar that there is advantage in packing as many goods as is possible into the space of a container.

This invention is thus especially we feel the loading of containers made according to I.S.O. standards such as are typically used for shipping purposes around the world and which is of rectangular proportions and is accessible from one end for loading purposes.

With present equipment, if the container is to be loaded from the floor to ceiling, each package, typically a bag of wheat, will have to be taken from a delivery elevator which has a fixed position and then "lumped" i.e. manually accepted, carried and placed into a stacked position.

Particular difficulty arises when the bag is to be located close to, or in fact adjacent, a ceiling where an individual can find great difficulty shifting a bag equivalent to a weight of perhaps 50 to 60 kilograms into such a confined space from one end only.

The difficulty is self-evident and, in practice, it is time-consuming and therefore expensive to achieve a fully packed container. Many containers are therefore not fully filled, with resultant waste space for transport purposes.

A major problem in providing a means for loading a container is to provide for a sufficiently good control to enable accurate placement of each package or loose material, and in particular with relatively heavy packages. A difficulty in providing a conveyor to convey the material is that the conveyor is quite bulky and material to be loaded generally falls from the end of the conveyor means into position. The conveyor takes up room above the position to be loaded and therefore a container cannot be filled to the top. One way of overcoming this is to manually unload from the end of the conveyor to the required position, and the problems of unloading a heavy package are outlined above again come into play.

SUMMARY OF THE INVENTION

This invention relates to a means by which materials can be delivered into a container.

The invention provides a loading apparatus which is adjustable in both forward-to-aft position as well as directions of slew and tilt so that materials whether packaged or not can be directed into a most convenient location.

The invention also provides a method of loading material into a container using a loading apparatus, wherein material is thrown into position in the container by a loading conveyor.

The invention can accordingly be said to reside in a method of loading material into a container using a loading apparatus, said apparatus comprising:

a base for providing support from a foundation;

an endless conveyor belt having a material carrying run and having a forward end and a rear end;

a conveyor support frame having a forward end roller means and a rear end roller means, said endless conveyor belt being entrained about said forward and rear end roller means;

means mounting said belt support frame on said base so as to permit said belt support frame, and therefore said endless conveyor belt to be:

extended and retracted longitudinally of said material carrying run, slewingly rotated about a generally vertical axis intersecting said material carrying run at a point intermediate said forward and rear ends, and tilted about a generally horizontal axis located substantially rearwardly of said forward end and disposed generally transversely of said material carrying run;

motor means operatively connected with said endless conveyor belt for driving said conveyor belt in a sense to advance said carrying run at a desired speed; the method including the steps of;

depositing the material on the material carrying run and near where said generally vertical axis for slewing rotation of said belt support frame intersects said material carrying run of said endless conveyor belt, accelerating the material on the endless conveyor belt so as to be thrown from the forward end, whereby a trajectory of the material thrown is without a significant vertical component.

The loading apparatus can be operated at such a speed that the material will leave the conveyor belt without a significant vertical component of trajectory.

This can be achieved with packaged materials of larger weight by providing that there is a separate serving conveyor which will load a package as required from time to time onto the loading conveyor which can then rapidly accelerate the package so that it will shoot at substantial speed from the end of the conveyor.

The actual speed to which the materials should be accelerated will be dependent entirely upon the loading situation, that is, whether the package such as a bag of wheat, is to be located with a tight fit in an uppermost corner position in which it is to be tightly jammed, or it is to be located simply on the floor as a first of a row or stack of bags.

Each position can be achieved by different speeds but speeds in the order of three to four meters per second as an exit speed will indicate the extent to which an end velocity is required, although to positioning at a greater distance an exit speed of the order of eight to ten meters per second can be provided.

By preference, the loading conveyor is supported so as to be rotatable for its slewing direction about a substantially vertical axis and the serving conveyor is adapted to drop the material or package on the loading conveyor in the vicinity of such vertical pivot axis. More preferably, the loading conveyor belt is substantially flat laterally with respect to the direction of travel.

In this way, location of the package is most easily achieved for consistently feeding in a proper position onto the loading conveyor. Additionally the flatness of the belt ensures that the package is positioned in line with walls of the container thereby providing for more efficient packaging.

By preference, the loading conveyor and the associated equipment are supported by a base such that the tray of a truck can pass therebeneath.

Other features and improvements will be better seen when reference is made to the now following description of a preferred embodiment and to the claims appended to this specification.

BRIEF DESCRIPTION OF THE DRAWINGS

Accordingly, a description will now be given of a preferred embodiment with the assistance of drawings in which.

DETAILED DESCRIPTION

Figure 1:
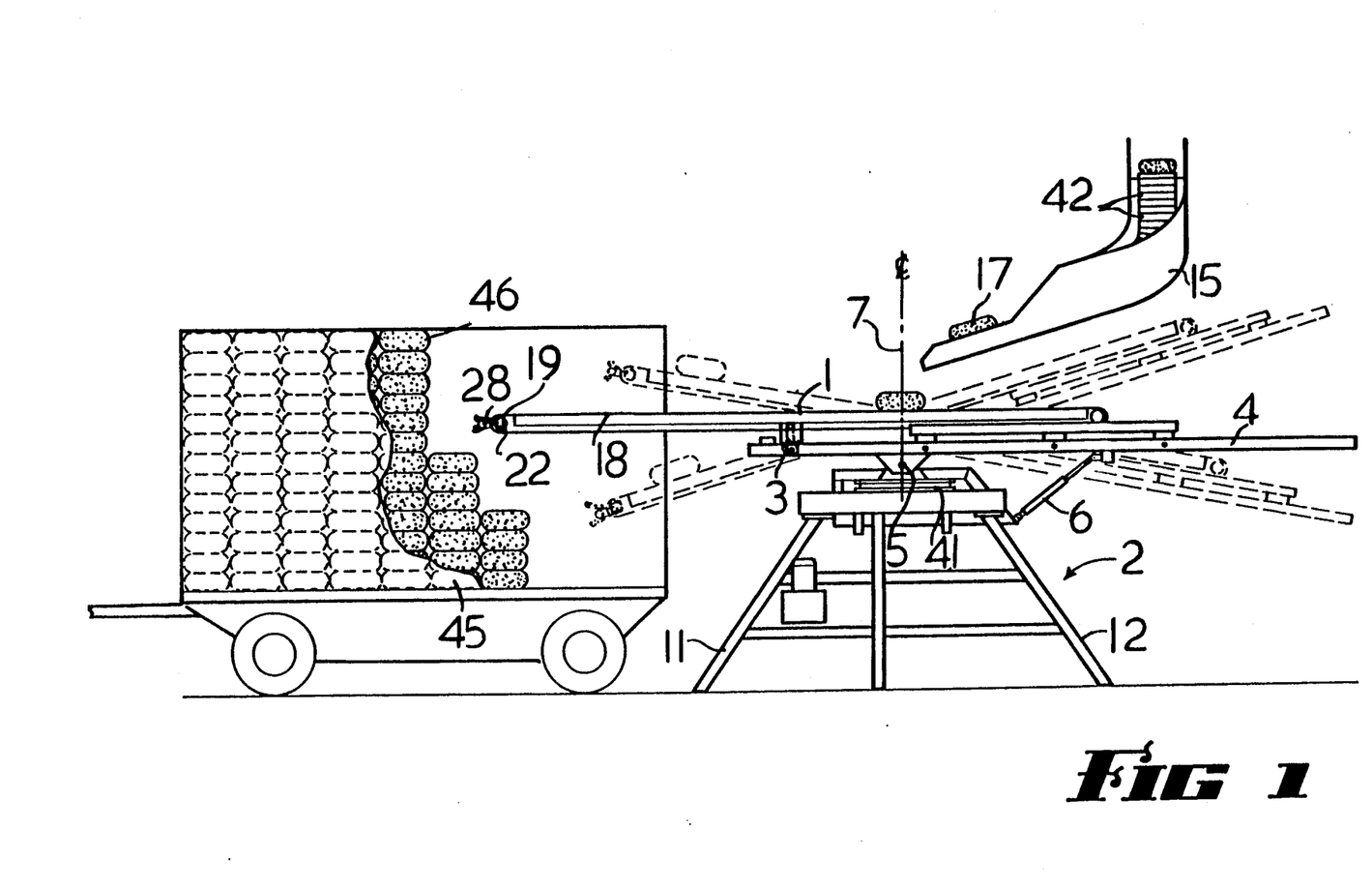
FIG. 1 is a side elevation showing in partly schematic and cutaway form a serving conveyor servicing a loading conveyor partly located within a container.
Figure 2:
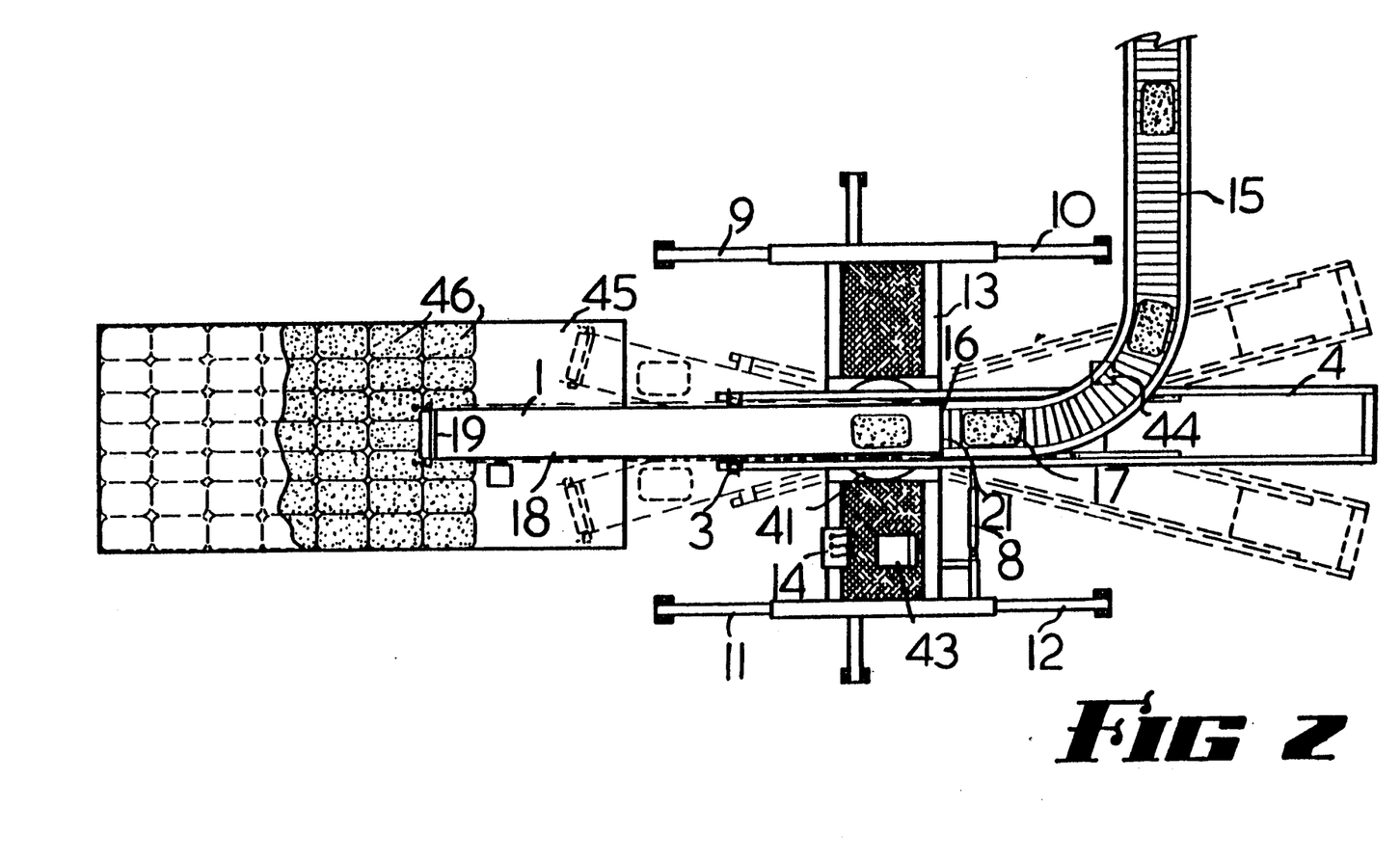
FIG. 2 is a plan view of the arrangement substantially as shown in FIG. 1 except that there is included an operator's seat and control panel.

Referring in detail to the drawings, and once again noting that FIGS. 1 and 2 are schematic, and that FIG. 2 has some added detail which is not shown in FIG. 1, there is shown a loading conveyor 1 which is supported on a base 2 in such a way that it can move both in a forward-to-aft direction which can be controlled by hydraulic motor 3, with respect to a support frame 4. The support frame 4 can be tilted about pivot axis 5 under the control of tilt rams 6 and which can be slewed by being pivotal around the vertical axis 7 under the control of slew ram 8.

The base 2 is comprised of a frame which comprises side legs 9 and 10 on one side and 11 and 12 on the other, such that the tray of a semi-trailer type vehicle can pass therebetween and beneath the control platform 13.

The control platform 13 includes a control panel 14 with the appropriate hydraulic controls to control the relative positioning of the loading conveyor, the speed of the conveyor and the drive of the serving conveyor 15.

The serving conveyor 15 rises from a side and then turns and, has an end 16 which is adapted to place a package of material such as at 17 by locating this at about the position of the pivot axis 7 so that the package is best positioned for acceleration by the loading conveyor 1.

The serving conveyor 15 is adapted to be stopped or started independently of the loading conveyor 1 so that packages of material can be fed one at a time onto the loading conveyor 1 to effect a rapid acceleration to the outer end of the loading conveyor 1.

The loading conveyor 1 includes a continuous belt 18 which extends to an outer end 19 where it extends around roller 20 and at an inner end or aft, as compared to forward, roller 21 where it extends around and is driven by motor 44.

Figure 6:
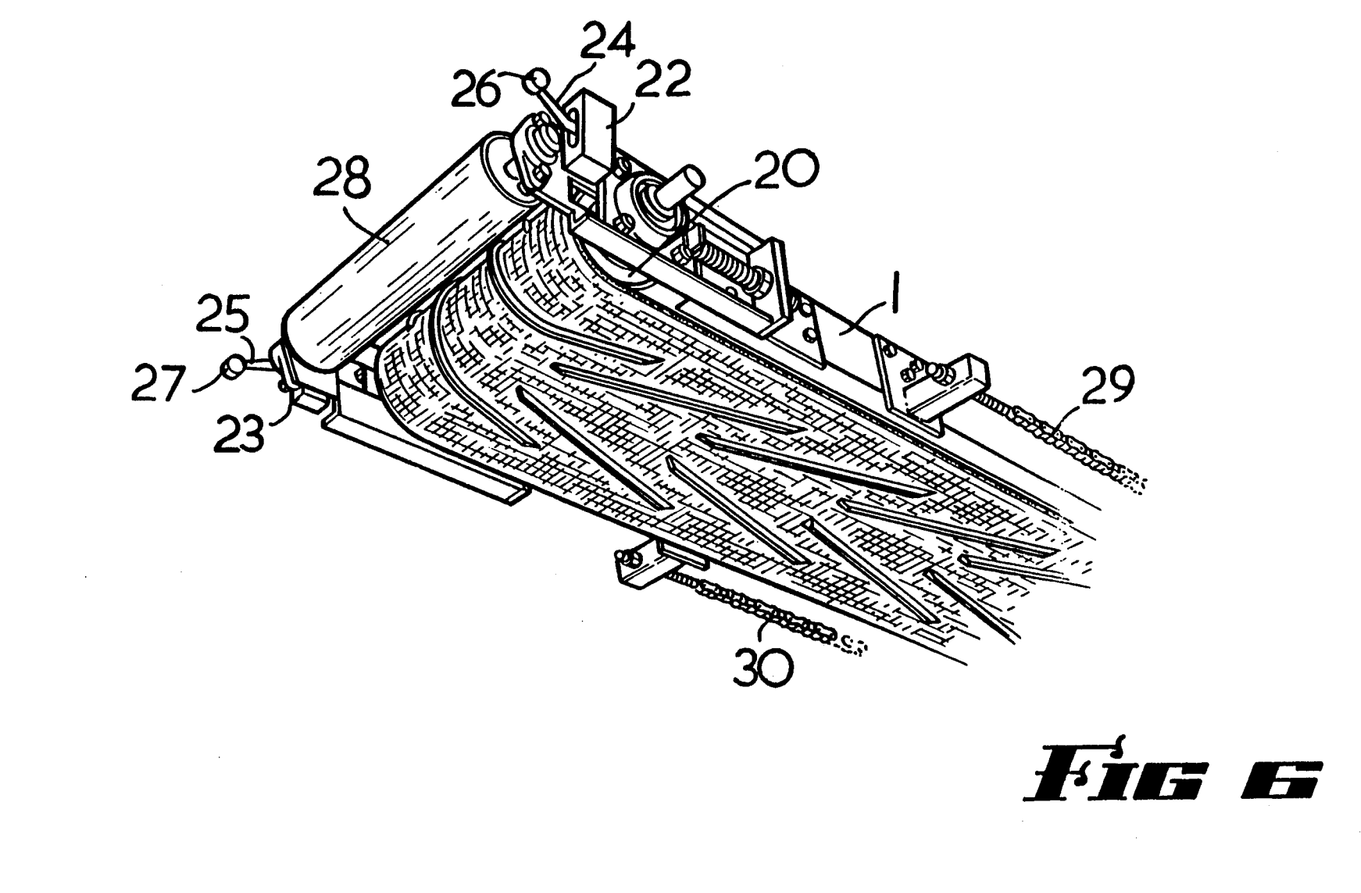
FIG. 6 is an underneath view of the outermost end of the loading conveyor showing, in particular, the outermost control means at both sides of an end roller.

At the forward or outer end of the loading conveyor 1 are control means 22 and 23 which incorporate electrical switches which are operable by movement against resilient spring pressure of arm 24 in the one case and 25 in the other.

The position of the respective arms 24 and 25 with an outer end comprising a knob 26 in the one case and 27 in the other, are such that if either of these contact against the side of a container there is effected through an electrical cable, a stop signal which then requires a reset action by the operator for restarting the drive motor 44 or rams 6 or 8.

An alternative is to provide an ultrasonic detector which signals a stop means to stop the drive motor on coming in close proximity to, for example, the sides of the container walls.

There is an outermost roller 28 which is adapted to provide support for the end of a bag of material, such as a bag of wheat, as such a bag is projected past the end of the belt.

The loading conveyor 1 is adapted to be operated so that it has a lateral belt speed over a variable range of speeds. A drive is coupled to the inner roller 21, the drive being powered by a variable speed electric motor. The coupling is such that the inner roller rotates at a range of speeds from 0 to approximately 550 r.p.m., which for an approximately 15 cm inner roller corresponds to a belt speed of approximately 8.6 meter per second.

It is to be understood that for heavier packages, a greater speed may be desired. However, too great a speed can be counter-productive and, for example, packaged material may bounce off either the container end wall or off of already stacked packages and cause the package to rebound. Thus, an efficient packaging pattern cannot be established. The variable speed motor control is also of great assistance in getting the best loading pattern. With a change in the distance that a package needs to be thrown as loading progresses, it is often necessary to give a package an extra burst of speed to fit it into a corner, or slow the speed of the belt down to avoid rebound in a more central location.

An intermediate speed of about four meters per second will ensure that a bag continues its forward trajectory after leaving the conveyor end, so that it will not drop more than twice its thickness after having travelled twice its length.

As has been said, however, the speed can be varied for appropriate conditions, and can be varied very quickly.

Figure 4:
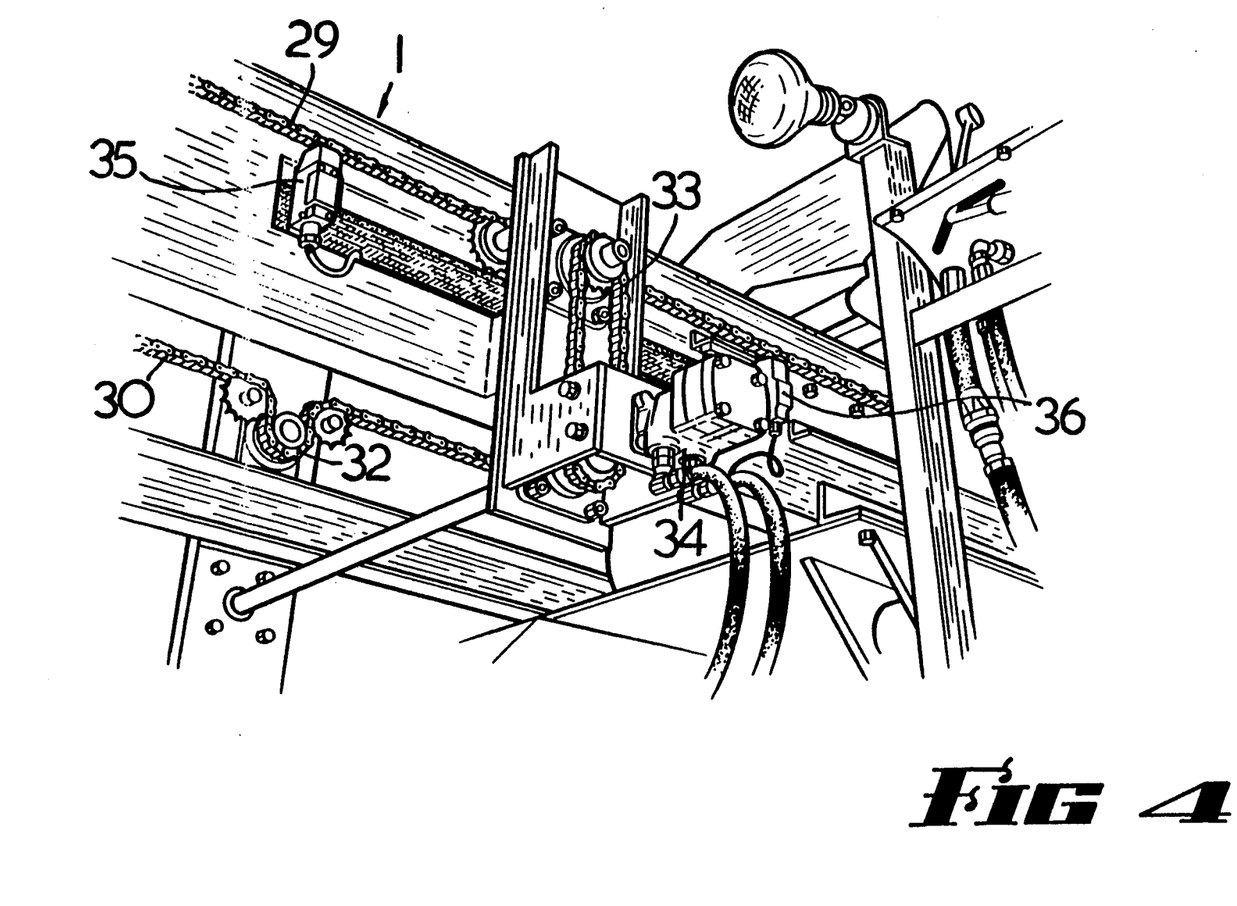
FIG. 4 is a perspective view of the drive assembly for forward-to-aft position control of the loading conveyor.

Returning to the construction of the apparatus, the position of the loading conveyor 1 is controllable in a forward-to-aft direction and this is achieved by two chains 29 and 30 being engaged by sprockets, such as at 32 which, in turn, are driven through chain 33 by hydraulic motor 34.

Limit switches 35 and 36 operate to limit the extent of forward-to-aft movement as determined by cams fixed to the chain 29.

Figure 5:
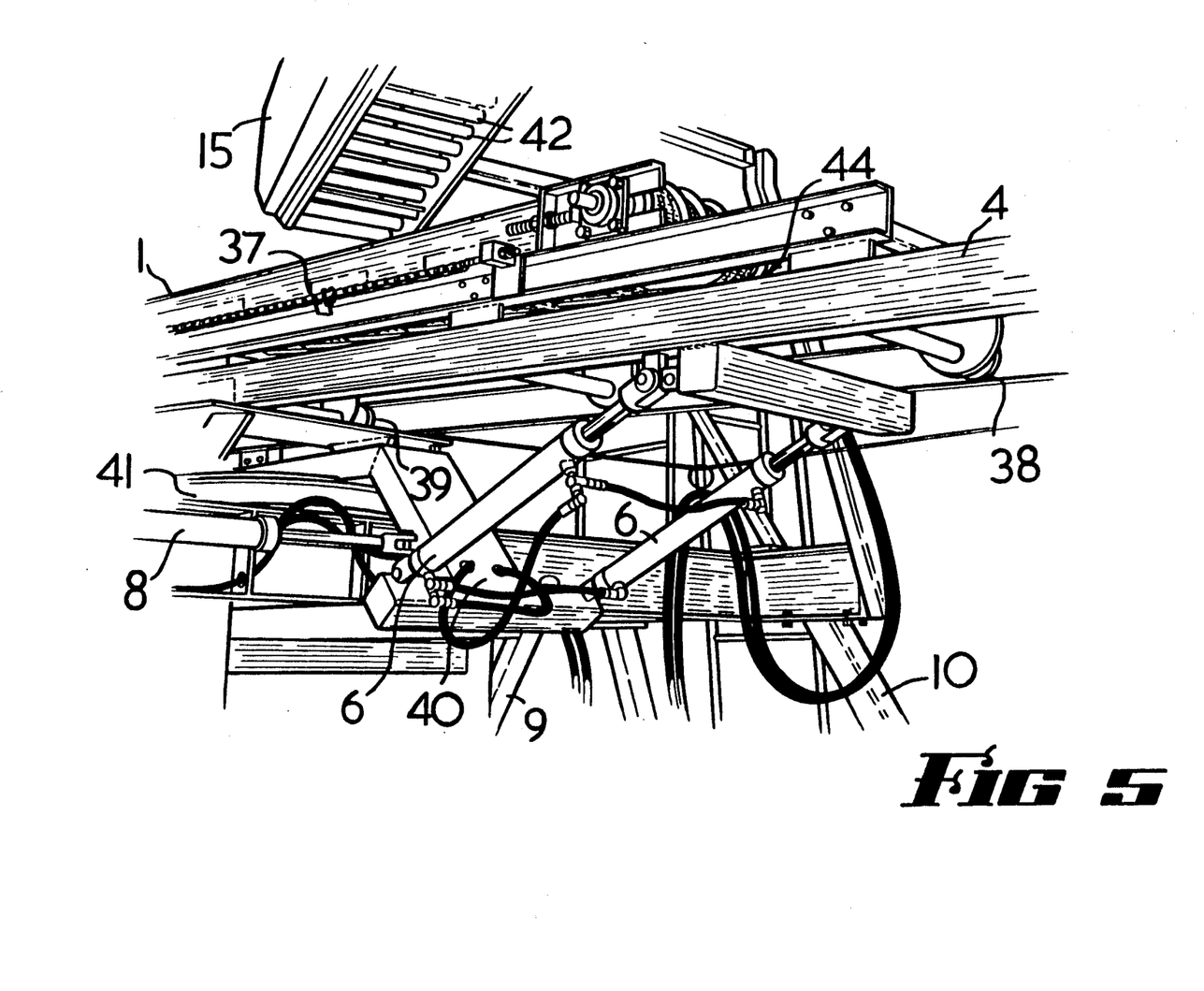
FIG. 5 is an underneath perspective view of the arrangement as shown in FIG. 3, especially showing the slewing control ram and the tilting control rams.

Such a cam is shown in FIG. 5 at 37.

The loading conveyor 1 is separately supportable on the support frame 4 in such a way that the loading conveyor can be moved forwardly and rearwardly and this is achieved by supporting the loading conveyor on wheels such as those shown in FIG. 5 at 38 and 39. The loading conveyor can be moved forward and aft over very nearly the entire length of the loading conveyor.

The support frame 4 includes an outwardly extending arm 40 to which are secured the tilt rams 6 which therefore follow the rotation of the loading conveyor 1.

Rotation about a substantially vertical axis is achieved by supporting the whole assembly on a turntable 41.

The serving conveyor 15 is operated by having a plurality of rollers, shown typically at 42, all of which are commonly coupled through a chain drive (which is not shown, but which is within a cowling on the side of the conveyor) so that these rollers are, in fact, driven under the control of a drive motor and, of course, are therefore separately controllable by the operator.

There is provided a seat 43 for an operator so that the operator, can sit substantially aligned with the loading conveyor and therefore essentially aim the loading conveyor 1 in the right direction for the next bag to be located.

Using an apparatus of this type has significantly reduced the time that has been hitherto necessary to load a container such as is shown at 45, and, furthermore, a container thus loaded can be loaded fully and tightly packed with packages 46 so that the best volume-to-weight ratio can be achieved, where appropriate.

The speed at which bags exit the loading conveyor, obviously, determines the trajectory of the package. The speed of the loader can be varied to suit the intended position of the package, taking into account the nature of the material to be loaded. With a speed sufficient to load the material to a position adjacent to and substantially level with the outer end of the loading conveyor a tight packing arrangement can be achieved. A greater than minimum velocity will be needed where it is desired to throw the material some distance from the conveyor. For effective placement, the material must leave the conveyor without a significant vertical component of trajectory, and depending on the nature of the material to be loaded this can be achieved by an exit speed of between 3 meters per second to 10 meters per second.

The conveyor belt of this embodiment has protruberances on the material carrying face, and in use, it is found that material to be loaded is accelerated very quickly; there is virtually no slipping of the material on the conveyor belt as it is fed onto the belt. Much of the strain of this very rapid acceleration is taken up by the belt and the drive of the belt, and a sturdy support has had to be provided for the belt, and thus the provision of an extendible belt for forward and aft manouvering of the outer end of the belt ends is impractical.

The apparatus according to this invention is capable of very rapid adjustment; and thus when fully extended the loading conveyor can be swung across its full arc in approximately one second; the extension and retraction of the conveyor belt can also be made very rapidly; as can the tilting.

This rapid adjustment can be quite crucial under circumstances where the material to be loaded is packaged material and where one horizontal plane has been loaded, the conveyor belt being aimed at one corner, and to start a new stacking plane the conveyor has to be targeted at a diagonally opposite corner.

The rapid adjustment thus under these circumstances must involve in adjustment in all three directions of adjustment.

Figure 3:
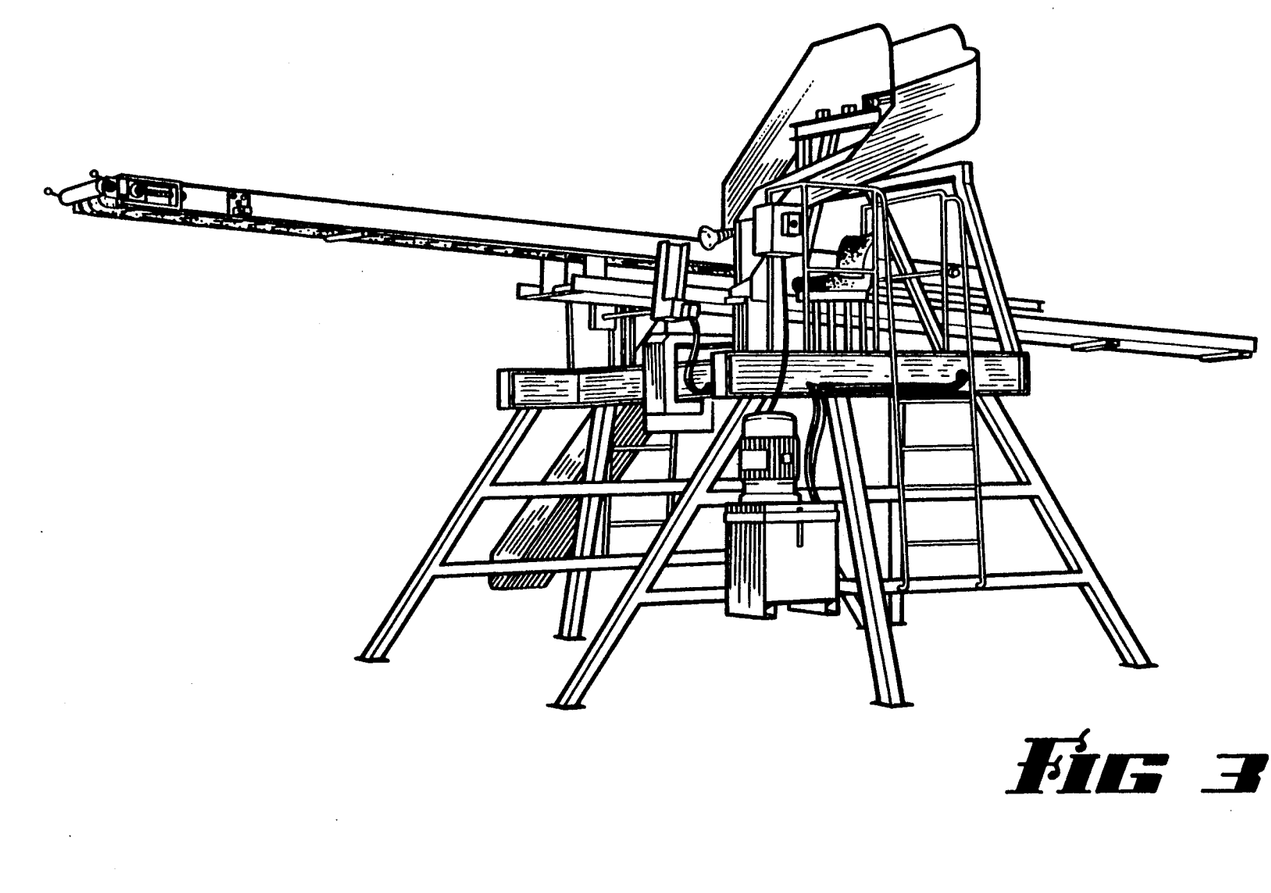
FIG. 3 is a perspective view showing, with further added parts, the loading conveyor and serving conveyor.

This then describes the preferred embodiment which has been described firstly in respect to schematic drawings and then more detailed drawings from FIGS. 3 through to 6.

While reference has been made to the loading of packaged materials, and I have in mind particularly bags of wheat or barley or other cereals, it is clear that the invention applies to a large number of materials and can also include the case where the materials are not packaged.

In this case a loading conveyor supported in the same way as described in the embodiment is, however, shaped so as to retain a concave cross-sectional shape along its length, and, this manner, unpackaged material such as the unpackaged wheat or barley or peas can therefore be fed into the concavity of this conveyor once again at an appropriate location along its length, and accelerated into a confined area within a container or some such device.

Once again, the speed of acceleration is appropriate for the particular materials and the application desired.

In a further alternate arrangement, there are proposed means by which there are automatic control means for locating and aligning the loading conveyor.

Accordingly, there are proposed computer means controlling the forward to aft drive motor, the tilt and slewing rams and belt speed such that there are provided a sequential positioning of the loading conveyor in accordance with such a program.

Necessarily, such a program will require means to establish a reference position of the end of the conveyor and in such an instance, the control means that have been used to provide a stopping of the conveyor belt can be used, and indeed are used, in such a way as to locate the end of the conveyor against first a one side of the container and then another, whereafter the conveyor will be controlled by the program with these two references controlling the positioning.

The serving conveyor can be appropriately coupled to such a program so as to only load a bag or other material onto the loading conveyor, as appropriate.

What is claimed is:

1. A method of loading material into a container using a loading apparatus, said apparatus comprising:
    a base for providing support from a foundation;
    an endless conveyor belt having a material carrying run and having a forward end and a rear end;
    a conveyor support frame having a forward end roller means and a rear end roller means, said endless conveyor belt being entrained about said forward and rear end roller means;
    means mounting said belt support frame on said base so as to permit said belt support frame, and therefore said endless conveyor belt to be:
    extended and retracted longitudinally of said material carrying run,
    slewingly rotated about a generally vertical axis intersecting said material carrying run at a point intermediate said forward and rear ends, and
    tilted about a generally horizontal axis located substantially rearwardly of said forward end and disposed generally transversely of said material carrying run;
    motor means operatively connected with said endless conveyor belt for driving said conveyor belt in a sense to advance said carrying run at a desired speed; wherein the method includes the steps of:
    depositing material on the material carrying run and near where said generally vertical axis for slewing rotation of said belt support frame intersects said material carrying run of said endless conveyor belt, and accelerating material on the endless conveyor belt to increase the speed of the material so the material is thrown from the forward end into the container, whereby a trajectory of the material thrown is without a significant vertical component.

2. A method of loading material into a container using a loading apparatus, said apparatus comprising:

a base for providing support from a foundation;

an endless conveyor belt having a material carrying run and having a forward end and a rear end;

a conveyor support frame having a forward end roller means and a rear end roller means, said endless conveyor belt being entrained about said forward and rear end roller means;

means mounting said belt support frame on said base so as to permit said belt support frame, and therefore said endless conveyor belt to be:

extended and retracted longitudinally of said material carrying run, slewingly rotated about a generally vertical axis intersecting said material carrying run at a point intermediate said forward and rear ends, and tilted about a generally horizontal axis located substantially rearwardly of said forward end and disposed generally transversely of said material carrying run;

motor means operatively connected with said endless conveyor belt for driving said conveyor belt in a sense to advance said carrying run at a desired speed; wherein the method including the steps of:

depositing material on the material carrying run and near where said generally vertical axis for slewing rotation of said belt support frame intersects said material carrying run of said endless conveyor belt, and accelerating material on the endless conveyor belt to increase the speed of the material so the material is thrown from the forward end into the container, wherein the material is accelerated to a rate of between 3 and 10 meters per second on said endless conveyor belt.

3. A method as in claim 1 wherein:

the material is a bag of wheat and the vertical component of the trajectory is such that the bag after traveling two bag-lengths forwardly of said forward end, has not dropped more than two bag thicknesses.

4. A method of loading material into a container using a loading apparatus, said apparatus comprising:

a base for providing support from a foundation;

an endless conveyor belt having a material carrying run and having a forward end and a rear end;

a conveyor support frame having a forward end roller means and a rear end roller means, said endless conveyor belt being entrained about said forward and rear end roller means;

means supporting said belt support frame on said base so as to permit said belt support frame, and therefore said endless conveyor belt to be:

extended and retracted longitudinally of said material carrying run, slewingly rotated about a generally vertical axis intersecting said material carrying run at a point intermediate said forward and rear ends, and tilted about a generally horizontal axis located substantially rearwardly of said forward end and disposed generally transversely of said material carrying run;

motor means operatively connected with said endless conveyor belt for driving said conveyor belt in a sense to advance said carrying run at a desired speed;

a serving conveyor extending from beyond said endless conveyor belt, to a site juxtaposed with said material carrying run and near where said generally vertical axis for slewing rotation of said belt support frame intersects said material carrying run of said endless conveyor belt, whereby material supplied onto said serving conveyor may be conveyed thereby and deposited onto said material carrying run of said endless conveyor belt at the said generally vertical axis;

motor means for operating to advance said carrying run of said endless conveyor belt, said method including the steps of:

depositing material on the material carrying run with the serving conveyor, accelerating the deposited material on the endless belt so as to increase the speed of the material, and throwing material from the forward end of the carrying run of the endless belt into the container, whereby a trajectory of the material thrown is without a significant vertical component.

5. The method as in claim 4 wherein:

the endless conveyor belt moves at a rate substantially greater than the rate of the serving conveyor.

6. The method as in claim 4 wherein:

the endless conveyor belt moves at a rate of between 3 and 10 meters per second.

7. A loading apparatus comprising:

a base for providing support from a foundation;

an endless conveyor belt having a material carrying run and having a forward end and a rear end;

a conveyor support frame having a forward end roller means and a rear end roller means, said endless conveyor belt being entrained about said forward and rear end roller means;

means mounting said belt support frame on said base so as to permit said belt support frame, and therefore said endless conveyor belt to be:

extended and retracted longitudinally of said material carrying run, slewingly rotated about a generally vertical axis intersecting said material carrying run at a point intermediate said forward and rear ends, and tilted about a generally horizontal axis located substantially rearwardly of said forward end and disposed generally transversely of said material carrying run;

motor means operatively connected with said endless conveyor belt for driving said conveyor belt in a sense to advance said carrying run at a desired speed;

a serving conveyor extending from beyond said endless conveyor belt, to a site juxtaposed with said material carrying run and near where said generally vertical axis for slewing rotation of a said belt support frame intersects said material carrying run of said endless conveyor belt, whereby material supplied onto said serving conveyor may be conveyed thereby and deposited onto said material carrying run of said endless conveyor belt;

motor means for operating to advance said carrying run of said endless conveyor belt, for advancing said carrying run at so great a velocity that a 100 kg bag of wheat having a given bag length and thickness, when deposited onto said carrying run by said serving conveyor and conveyed thereon while said carrying run is generally horizontal, is accelerated and exits from said forward end of said carrying run at a forward velocity of about four meters per second and thereby, after travelling two bag-lengths forwardly of said forward end, has dropped not more than two bag thicknesses.

8. A loading apparatus as in claim 7, further including:

means for rapid control of the speed of the motor, and therefore the speed of the endless conveyor belt.

9. A loading apparatus as in claim 7 wherein
said base comprises an elevated control platform onto which said mounting means is carried, and a plurality of foundation-engaging support legs which support said elevated platform and straddle a path which is wider than a standard international shipping container.

10. A loading apparatus as in claim 7 wherein said belt is substantially flat in cross section lateral to the direction of movement of the belt.

* * * * *